US 8,571,736 B2

(12) United States Patent
Falkenstein et al.

(10) Patent No.: US 8,571,736 B2
(45) Date of Patent: Oct. 29, 2013

(54) METHOD FOR OPERATING A DRIVE DEVICE OF A MOTOR VEHICLE AND DRIVE DEVICE FOR A MOTOR VEHICLE

(75) Inventors: Jens-Werner Falkenstein, Aalen (DE); Manfred Hellmann, Hardthof (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/389,478

(22) PCT Filed: Aug. 12, 2010

(86) PCT No.: PCT/EP2010/061771
§ 371 (c)(1),
(2), (4) Date: Apr. 26, 2012

(87) PCT Pub. No.: WO2011/045101
PCT Pub. Date: Apr. 21, 2011

(65) Prior Publication Data
US 2012/0209464 A1  Aug. 16, 2012

(30) Foreign Application Priority Data

Oct. 12, 2009 (DE) .......................... 10 2009 045 567

(51) Int. Cl.
*B60L 11/00* (2006.01)
(52) U.S. Cl.
USPC .............................. 701/22; 701/101; 903/902
(58) Field of Classification Search
USPC ................ 701/22, 99, 101; 477/3, 7; 903/902
See application file for complete search history.

(56) References Cited

U.S. PATENT DOCUMENTS

| 6,038,505 | A  | * | 3/2000  | Probst et al. ..................... 701/65 |
| 6,125,314 | A  | * | 9/2000  | Graf et al. ........................ 701/53 |
| 6,188,945 | B1 | * | 2/2001  | Graf et al. ........................ 701/58 |
| 6,199,001 | B1 |   | 3/2001  | Ohta et al. |
| 6,401,012 | B1 |   | 6/2002  | Aoki et al. |
| 7,999,499 | B2 | * | 8/2011  | Tanaka et al. ................. 318/434 |
| 8,024,081 | B2 | * | 9/2011  | Fleckner et al. ................ 701/22 |
| 2001/0025220 | A1 |  | 9/2001 | Kaneko et al. |
| 2002/0161507 | A1 |  | 10/2002 | Fuse |
| 2003/0029406 | A1 |  | 2/2003  | Weiss |
| 2009/0178866 | A1 | * | 7/2009 | Schwemer et al. ...... 180/65.265 |
| 2011/0112708 | A1 |   | 5/2011  | Fassnacht |

FOREIGN PATENT DOCUMENTS

| DE | 10041789    | 5/2001  |
| DE | 102008001159 | 10/2009 |
| DE | 102008001691 | 11/2009 |
| EP | 1283357     | 2/2003  |

OTHER PUBLICATIONS

International Search Report, International Application No. PCT/EP2010/061771, dated Oct. 26, 2010.

* cited by examiner

*Primary Examiner* — Russell Frejd
(74) *Attorney, Agent, or Firm* — Kenyon & Kenyon LLP

(57) ABSTRACT

A method for operating a drive device of a motor vehicle, which includes at least one internal combustion engine and at least one electric machine, a driving resistance, in particular an uphill gradient, being ascertained and the internal combustion engine being operated as a function thereof. The internal combustion engine is operated as a function of a driving resistance to be expected, which is determined as a function of an instantaneous driving resistance. A drive device for a motor vehicle is also described.

13 Claims, 2 Drawing Sheets

METHOD FOR OPERATING A DRIVE DEVICE OF A MOTOR VEHICLE AND DRIVE DEVICE FOR A MOTOR VEHICLE

FIELD OF THE INVENTION

The present invention relates to a method for operating a drive device of a motor vehicle, which includes at least one internal combustion engine and at least one electric machine, a driving resistance, in particular an uphill gradient, being ascertained and the drive device being operated as a function thereof.

Furthermore, the present invention relates to a drive device for a motor vehicle in particular for carrying out the above-described method, which includes at least one internal combustion engine and at least one electric machine, and a device for detecting a driving resistance, in particular, an uphill gradient.

BACKGROUND INFORMATION

Modern motor vehicles increasingly have so-called hybrid drive devices, to which, in addition to an internal combustion engine, at least one electric machine is available for providing a drive torque. Hybrid drive systems of this type normally include the option to implement a purely electric driving operation in which the internal combustion engine is turned off to save fuel and to reduce pollutant emissions. If the driver of a motor vehicle of this type requires a drive torque which the electric machine alone is unable to make available, the internal combustion engine is started. If the internal combustion engine is started with the aid of the same electric machine which is responsible for the propulsion during electric driving, the torque required for starting the internal combustion engine must be held ready. Also, an instantaneous uphill gradient as a driving resistance may be determined, and internal combustion engine may be started as a function thereof. If the driving resistances increase during the electric driving operation, for example, due to a change in the roadway uphill gradient or due to driving over a curb, the torque requirement for ensuring the propulsion increases. This may be compensated for by the driver by actuating the accelerator pedal as necessary, which causes the internal combustion engine to start. However, a minimum time period elapses before the internal combustion engine is started and the full internal combustion engine torque is available. This has a negative effect on the driving comfort. Depending on the design of the driving device, even an interruption of traction may occur during the start of the internal combustion engine. In particular, on uphill gradients this has a negative effect on the driving comfort.

SUMMARY

An example method according to the present invention provides that the internal combustion engine is operated as a function of a driving resistance to be expected, which is determined as a function of an instantaneous driving resistance. An uphill gradient, which a motor vehicle having a drive device must overcome or drive over is taken into account here as a preferred driving resistance. Thus, in addition to determining the instantaneous driving resistance, a prediction also takes place, providing information about a driving resistance to be expected. Knowing the driving resistance to be expected allows the internal combustion engine of the drive device to be started even before its torque is needed. Starting the internal combustion engine in situations or at points in time when high drive torques are needed may thus be avoided. With the aid of the determined driving resistance to be expected, the internal combustion engine may be prevented from stalling, so that a presumably occurring start-up operation of the internal combustion engine does not even become necessary. An inclination sensor is preferably used for detecting the instantaneous uphill gradient. In addition, data from a navigation system of the motor vehicle is advantageously used. Modern navigation systems make it possible, in addition to a two-dimensional illustration or calculation of a travel route, also to take into account altitude data and thus uphill gradients that will be encountered. By taking into account the data of the navigation system, an appropriate strategy may be used far ahead of time to start the internal combustion engine at a point in time that does not impair the driving operation.

An instantaneous change in the driving resistance is advantageously taken into account for determining the driving resistance to be expected. The change over time in the instantaneous driving resistance is detected or determined for this purpose. The change over time allows the future or to be expected driving resistance to be estimated. Particularly preferably, the instantaneous driving resistance is extrapolated using the instantaneous change in driving resistance for determining the driving resistance to be expected. The characteristics curve thus generated provides information, in a simple manner, about the driving resistance to be expected.

The internal combustion engine is preferably started if the determined driving resistance to be expected exceeds a predefinable threshold value. That is, if the driving resistance to be expected exceeds the threshold value, the internal combustion engine is started even before the instantaneous driving resistance reaches the threshold value, so that the delay which would negatively affect the driving comfort or an unpleasant jerk is avoided.

It is furthermore provided that, in determining the driving resistance to be expected, at least one parameter for weighting the instantaneous change in the driving resistance is taken into account. It is thus provided that the instantaneous change in driving resistance is weighted as a function of general conditions.

The vehicle speed is preferably taken into account as the parameter for weighting. Thus, the parameter is preferably selected to be greater or is given a higher weight for low speeds, at which an interruption of traction at the start of the internal combustion engine has a particularly negative effect, than for high vehicle speeds.

Alternatively or additionally, a predefinable (fixed) time value is taken into account as the parameter for weighting. Particularly preferably, the time value varies as a function of the vehicle speed as described above.

Finally, it is provided that the predefinable threshold value is selected as a function of an instantaneously possible drive torque of the electric machine. The instantaneously possible drive torque of the electric machine depends, in particular, on the energy stored in an energy storage device associated with it. If the energy storage device is discharged, this results in a reduction of the maximum possible drive torque of the electric machine. By selecting the predefinable threshold value as a function of the instantaneously possible, i.e., the maximum possible drive torque, this circumstance, i.e., the charge state of the energy storage device, is taken into account. This ensures that even in the case of a partially discharged energy storage device an increased driving resistance does not result in loss of driving comfort. Alternatively, the predefinable threshold value may also be selected directly as a function of the charge state of the energy storage associated with the electric machine.

The example drive device according to the present invention is characterized in that the device for detecting a driving resistance, in particular an uphill gradient, determines a driving resistance to be expected as a function of an instantaneous driving resistance and activates the internal combustion engine as a function of the driving resistance to be expected. The device is advantageously designed in such a way that it initiates a start and/or a stop of the internal combustion engine as a function of the driving resistance to be expected. The device may be present in the form of a control unit or a control unit structure. Thus, in particular, in the latter case, the device may include a driving resistance detection device and a control unit of the internal combustion engine, the driving resistance detection device transmitting signals to the control unit of the internal combustion engine, which either first evaluates the signals and activates the internal combustion engine as a function thereof or is directly controlled by the signals.

The device, in particular the driving resistance detection device, preferably has at least one inclination sensor. An uphill gradient or an inclination of a roadway on which the motor vehicle having the drive device is located may be detected with the aid of the inclination sensor in a particularly easy manner as the driving resistance. Logically, the uphill gradient or inclination of the roadway is considered in the direction of travel of the motor vehicle.

Finally, it is provided that the device includes a detector for detecting the instantaneous vehicle speed and/or the instantaneously possible drive torque of the electric machine. The detector for detecting the instantaneously possible drive torque of the electric machine is preferably a circuit and/or a device which detects or determines the charge state of an energy storage device associated with the electric machine. The charge state of the energy storage device is used as the basis for the possible, i.e., the instantaneously maximally possible drive torque of the electric machine. The detector for detecting the instantaneous vehicle speed are preferably conventional vehicle speed sensors. The electric machine is preferably designed as a starter-motor-generator. The electric machine is thus both a starter for the internal combustion engine and an electric machine which may be operated as a motor or a generator and which may be used for providing a drive torque for the motor vehicle or for generating electrical energy.

Below, the present invention is elucidated in greater detail with reference to the figures.

DETAILED DESCRIPTION OF EXAMPLE EMBODIMENTS

Figure 1:
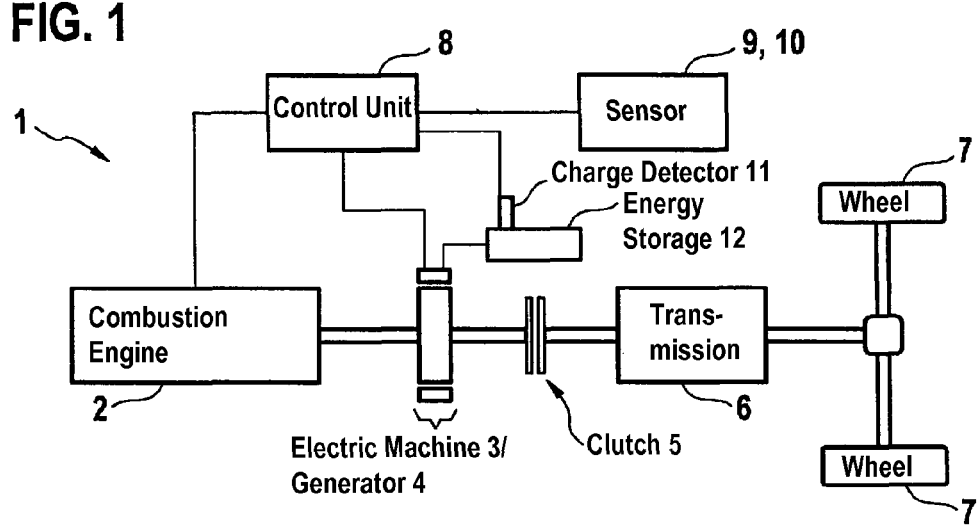
FIG. 1 shows a drive device in a simplified illustration.

FIG. 1 shows a drive device 1 for a motor vehicle in a simplified illustration. Drive device 1 includes an internal combustion engine 2 and an electric machine 3. Electric machine 3 is designed as a starter-motor-generator 4 and, for this purpose, its rotor is non-rotatably connected to the crankshaft of internal combustion engine 2, so that by operating electric machine 3 as a motor, internal combustion engine 2 may be started. The drive torque generated by internal combustion engine 2 and/or electric machine 3 may be transferred to a conventional transmission 6 by engaging a clutch 5, the output shaft of the conventional transmission being connected to driving wheels 7 of the motor vehicle. Conventional transmission 6 may be either a manual or an automatic transmission. It may also be a transmission having a continuously adjustable transmission ratio. Drive device 1 furthermore includes a control unit 8, which is used for the coordinated activation essentially of internal combustion engine 2 and of electric machine 3. Furthermore, control unit 8 is connected to a device 9 for detecting a driving resistance, which is designed here as inclination sensor 10. Finally, control unit 8 is connected to a device 11 for detecting the charge state of a rechargeable energy storage device 12 associated with electric machine 3.

Figure 2:
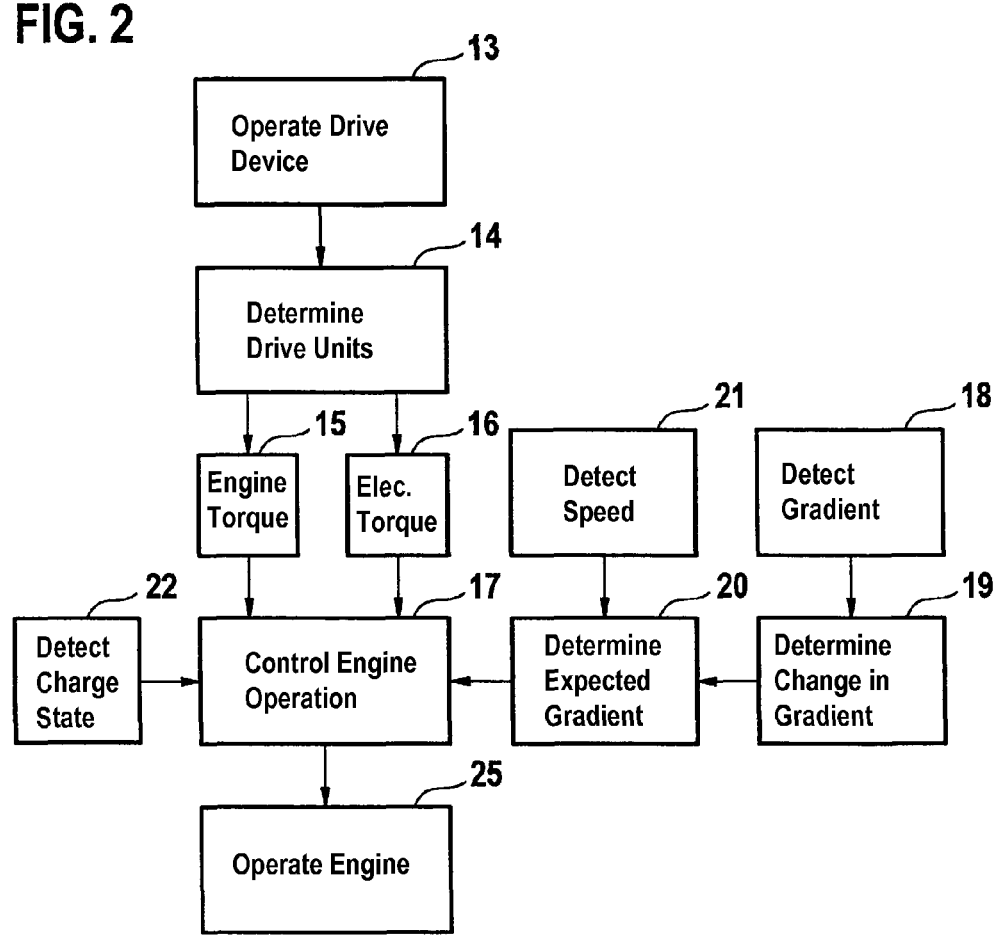
FIG. 2 shows an exemplary embodiment of an advantageous method for operating the drive device.

One advantageous method for operating drive device 1 will now be described with reference to FIGS. 2, 3A, and 3B.

Initially, in a first step 13, drive device 1 of the motor vehicle is set in operation. In a second step 14, it is advantageously determined, as a function of a driver input torque, which of the above-named drive units 2, 3 are to be used and how. Initially, it should be assumed that, after starting drive device 1, a purely electrical operation takes place, i.e., that a drive torque is generated by electric machine 3 alone, while internal combustion engine 2 is shut off and is preferably uncoupled from the remaining drive train with the aid of an additional clutch, not shown in FIG. 1. This may be the case, for example, when the charge state of energy storage device 12 is above a predefinable threshold value. During purely electrical operation, a driver input torque is implemented by electric machine 3 alone. In subsequent steps 15 and 16, an appropriate drive torque is predefined according to the operating mode and driver input torque of the internal combustion engine 2 (step 15) and electric machine 3 (step 16).

In modern motor vehicles, in which internal combustion engine 2 is stopped to reduce fuel consumption and emissions, and in which a purely electric driving operation is temporarily carried out, in situations where the drive torque of electric machine 3 is no longer sufficient, internal combustion engine 2 may be started to provide a drive torque of its own. If the start operation of internal combustion engine 2 takes place by operating electric machine 3 as a motor, for example, while the vehicle is on an uphill gradient, this may result, in particular with double-clutch transmissions having an integrated electric machine, in an interruption of traction and thus in a perceptible jerk, which has a negative effect on the driver comfort.

In a subsequent step 17, the operation of internal combustion engine 2 is controlled as a function of a driving resistance to be expected, in particular as a function of an uphill gradient to be expected. The control of the operation of internal combustion engine 2 generally includes switching on the internal combustion engine or preventing the internal combustion engine from being switched off.

In the present exemplary embodiment, an uphill gradient of the roadway on which the motor vehicle is located, such as a parking garage ramp or the like, is taken into account as the driving resistance. For this purpose, in a further step 18, the instantaneous uphill gradient is initially detected with the aid of inclination sensor 10. In a subsequent step 19, an instantaneous change in the uphill gradient is determined on the basis of the detected instantaneous uphill gradient. In subsequent step 20, an uphill gradient to be expected, i.e., a driving resistance to be expected, is determined from the instantaneous uphill gradient and the instantaneous change in uphill gradient. This may take place by using the following equations:

$$F_r(t_0+T)=F_r(t_0)+(dF_r/dt)*T$$

The instantaneous driving resistance is expressed by $F_r(t_0)$ and the predicted driving resistance to be expected is expressed by $F_r(t_0+T)$, $t_0$ being the instantaneous point in time at which the driving resistance to be expected or the uphill gradient to be expected is calculated/determined. The instantaneous change in the uphill gradient, i.e., in general, the change in driving resistance, is advantageously weighted as a function of the instantaneous vehicle speed and/or a predefinable time value. Value T may be a fixed, predefinable time period, which is determined or varied as a function of the situation. If value T is determined or varied as a function of the instantaneous vehicle speed, value T is preferably selected to be greater for low vehicle speeds, at which an interruption of traction has a particularly negative effect, than for high vehicle speeds. For this purpose, in a step 21, the instantaneous vehicle speed is advantageously detected.

In step 17, the driving resistance to be expected is compared to a predefinable threshold value S. Threshold value S is advantageously determined as a function of an instantaneously possible drive torque of the electric machine. For this purpose, the charge state of energy storage device 12 is preferably detected with the aid of device 11 in a step 22, and threshold value S is determined as a function of the charge state of the energy storage device. Since, with a fully charged energy storage device 12, electric machine 3 may generate a higher torque over a longer period of time than in a discharged state of energy storage device 12, threshold value S is reduced with a decreasing charge state of energy storage device 12.

If, in step 17, the threshold value is detected to have been exceeded by the driving resistance to be expected or the uphill gradient to be expected, internal combustion engine 2 is started before the instantaneous driving resistance equals the previously determined driving resistance to be expected, so that at the point in time at which the drive device must generate a total drive torque for overcoming the driving resistance to be expected, the full drive torque of the internal combustion engine is already available and, in particular, an interruption of traction does not occur in critical situations.

Figure 3A:
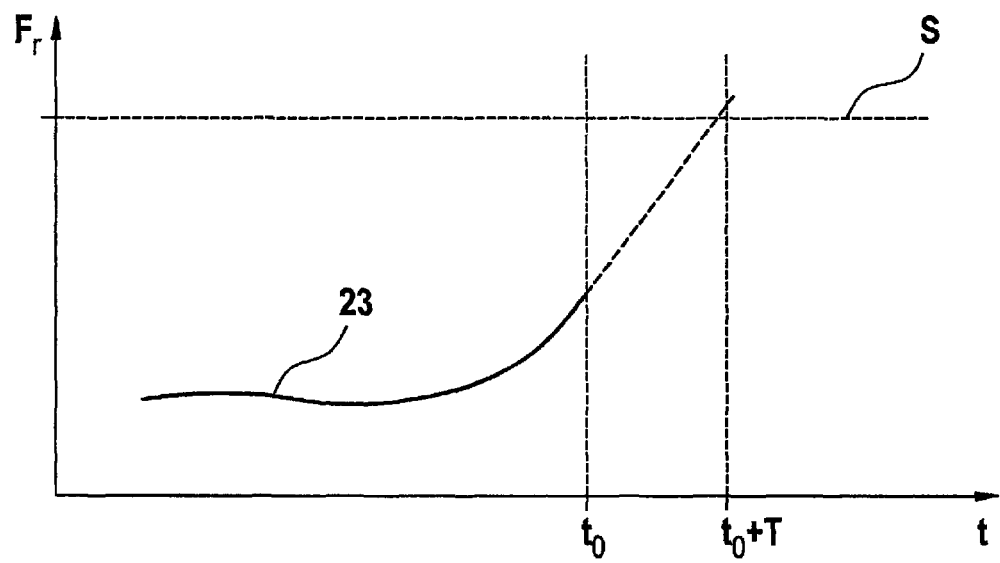
FIGS. 3A and 3B show two exemplary embodiments of the driving resistances to be expected.
Figure 3B:
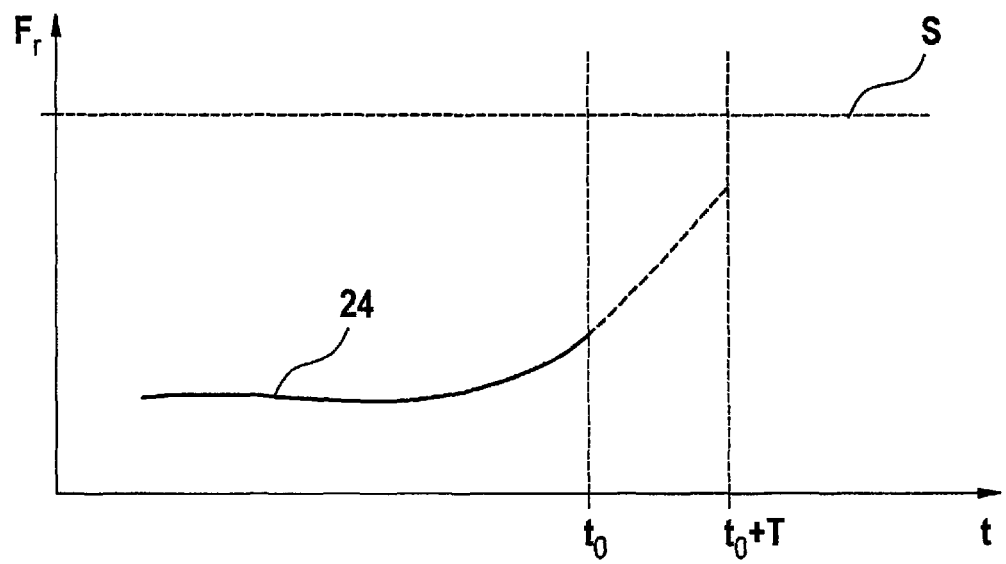

FIGS. 3A and 3B each show the comparison between a driving resistance to be expected and a predefined threshold value. For this purpose, a characteristics curve 23 (FIG. 3A) and a characteristics curve 24 (FIG. 3B) are plotted over time t, characteristics curves 23, 24 representing a measure $F_r$ for the driving resistance (solid line) and for the driving resistance to be expected (dashed line). In both cases, at a point in time $t_0$ the instantaneous driving resistance $F_r(t_0)$ and the instantaneous change in driving resistance ($dF_r/dt$) are determined as described above. Driving resistance to be expected $F_r(t_0+T)$ at a point in time $t_0+T$ is calculated therefrom by extrapolation as represented by a dashed line. In the first case according to FIG. 3A, characteristics curve 23 thus generated intersects predefinable threshold value S, while characteristics curve 24 is still below threshold value S at point in time $t_0+T$. This is primarily due to the fact that, at point in time $t_0$, different instantaneous changes in the driving resistance and thus different uphill gradients of the dashed line are present. If driving resistance to be expected $F_r(t_0+T)$ exceeds threshold value S, as shown in FIG. 3A, the internal combustion engine is started at point in time $t_0$ in a concluding step 25, as shown in FIG. 1. Otherwise, if, for example, a situation according to characteristics curve 24 exists, the purely electric driving operation of the drive device continues.

If the motor vehicle is stopped on a stretch whose uphill gradient to be expected exceeds the threshold value, internal combustion engine 2 is advantageously not stopped automatically as it would occur, for example, while driving on a horizontal surface. Thus, sufficient torque is immediately available for continued driving, so that, in particular, rollback when starting on the uphill gradient is avoided. The behavior of the drive device while standing is advantageously influenced by the driving resistance to be expected. For example, if the motor vehicle stands on an uphill gradient, whose absolute value exceeds threshold value S, the internal combustion engine is started as soon as the intention to drive is established, i.e., by starting drive device 1 (ignition on and optionally gear selection lever in position D). With the aid of these measures, the full drive torque of the internal combustion engine and the electric machine is available to the driver of a motor vehicle of this type immediately after the motor vehicle is started.

Furthermore, the prediction or determination of the driving resistance to be expected may be used for preventing the internal combustion engine from stalling, so that a subsequent start operation of internal combustion engine 2 predicted by the prediction does not become necessary. If driving resistance to be expected $F_r(t_0+T)$ exceeds predefinable threshold value S, running internal combustion engine 2 is advantageously not turned off. It is provided that in another exemplary embodiment the driving resistance to be expected is always determined regardless of whether or not internal combustion engine 2 is running.

In summary, an example method and an example drive device are provided here which increase the driving comfort by determining, in an easy manner, the driving resistance to be expected.

What is claimed is:

1. A method for operating a drive device of a motor vehicle, which includes at least one internal combustion engine and at least one electric machine, the method comprising:
    detecting an uphill gradient;
    ascertaining a driving resistance from the detected uphill gradient;
    determining a driving resistance to be expected as a function of the detected uphill gradient and a change in the detected uphill gradient;
    scaling the change in the detected uphill gradient by a scaling factor that increases as a speed of the motor vehicle decreases; and
    operating the internal combustion engine as a function of the driving resistance to be expected.

2. The method as recited in claim 1, wherein an instantaneous change in driving resistance is taken into account for determining the driving resistance to be expected.

3. The method as recited in claim 1, further comprising:
    starting the internal combustion engine if a predefinable threshold value is exceeded by the determined driving resistance to be expected.

4. The method as recited in claim 1, wherein in determining the driving resistance to be expected, at least one parameter for weighting an instantaneous change in driving resistance is taken into account.

5. The method as recited in claim 1, wherein vehicle speed is taken into account as a parameter in determining the driving resistance to be expected.

6. The method as recited in claim 1, wherein a predefinable time value is taken into account as a parameter in determining the driving resistance to be expected.

7. The method as recited in claim 3, wherein the predefinable threshold value is selected as a function of an instantaneously possible drive torque of the electric machine.

8. A drive device for a motor vehicle, comprising:
at least one internal combustion engine;
at least one electric machine; and
a device configured to:
    detect an uphill gradient;
    ascertain a driving resistance from the detected uphill gradient;
    determine a driving resistance to be expected as a function of the detected uphill gradient and a change in the detected uphill gradient;
    scale the change in the detected uphill gradient by a scaling factor that increases as a speed of the motor vehicle decreases; and
    operate the internal combustion engine as a function of the driving resistance to be expected.

9. The drive device as recited in claim 8, wherein the instantaneous driving resistance is an instantaneous uphill gradient.

10. The drive device as recited in claim 8, wherein the device has at least one inclination sensor.

11. The drive device as recited in claim 8, wherein the device includes a detector configured to detect at least one of an instantaneous vehicle speed, and an instantaneously possible drive torque of the electric machine.

12. The method as recited in claim 1, further comprising starting the internal combustion engine if the driving resistance to be expected exceeds a maximum available drive torque of the electric machine.

13. The method as recited in claim 12, further comprising calculating the maximum available drive torque of the electric machine as a function of a charge state of an energy storage device of the electric machine.

* * * * *